(No Model.)

G. F. GERRISH.
Refrigerator.

No. 236,798. Patented Jan. 18, 1881.

Witnesses
Chas. H. Smith
J. Staib

Inventor
George F. Gerrish
per Lemuel W. Serrell
atty

N. PETERS, PHOTO-LITHOGRAPHER, WASHINGTON, D. C.

UNITED STATES PATENT OFFICE.

GEORGE F. GERRISH, OF NEW YORK, N. Y.

REFRIGERATOR.

SPECIFICATION forming part of Letters Patent No. 236,798, dated January 18, 1881.

Application filed October 22, 1880. (No model.)

*To all whom it may concern:*

Be it known that I, GEORGE F. GERRISH, of the city and State of New York, have invented an Improvement in Refrigerators, of which the following is a specification.

This invention relates to a peculiar weighing apparatus introduced into a refrigerator in such a manner that it can be entirely closed up within the refrigerator or the platform of the scale swung out for use in weighing ice, meat, or other articles.

Refrigerators have been made in which the platform or box that receives the ice has been connected to a scale so as to weigh the ice that is put into the ice box or chest. In this case the scale is not adapted to any use except the weighing of the ice, and the scale is liable to injury by the concussion arising from introducing the ice into the chest.

Figure 1:
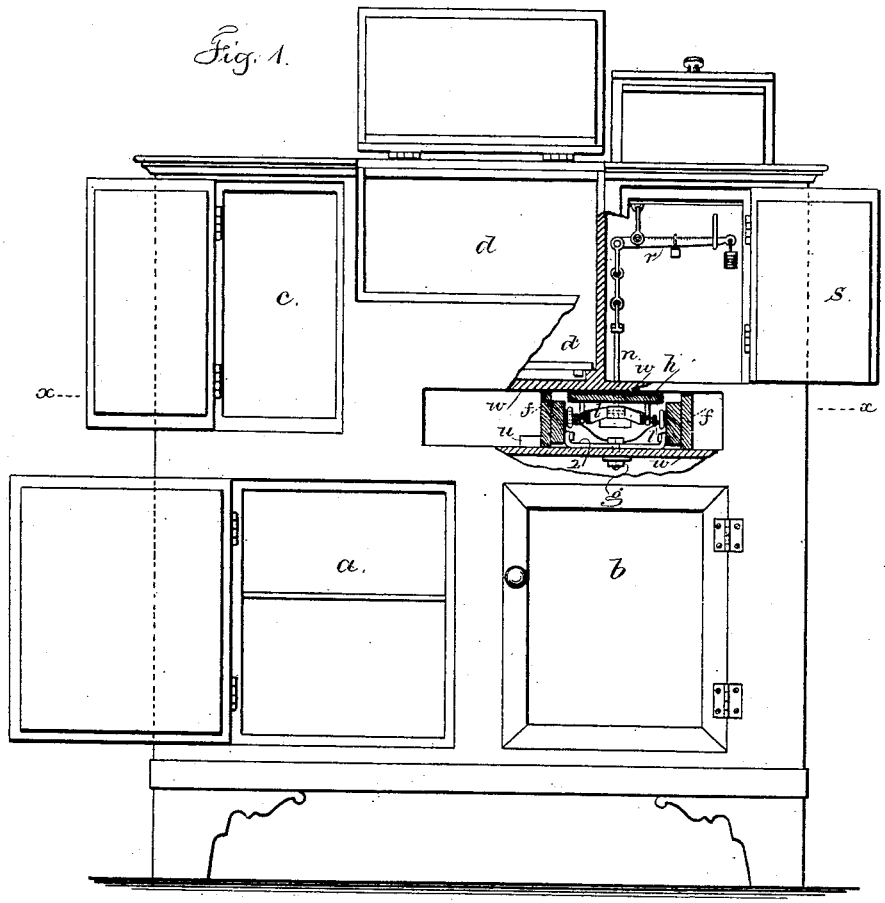
Figure 2:
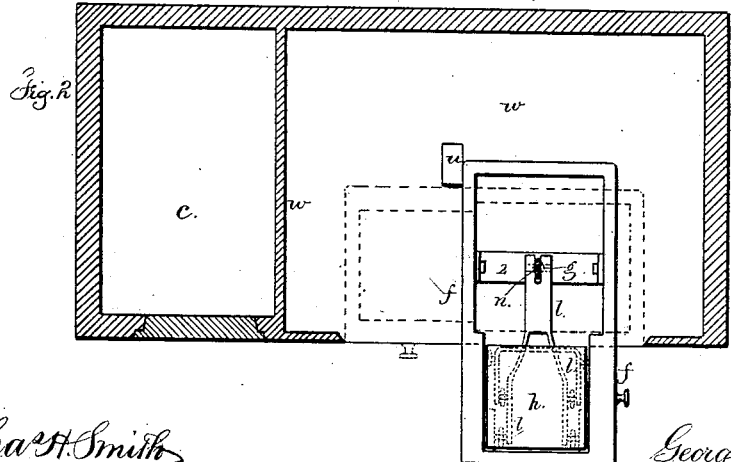

In the drawings, Figure 1 is a vertical section of the weighing apparatus and partial section of the refrigerator, and Fig. 2 is a sectional plan at the line $x$ $x$.

The refrigerator itself may be of any desired character. I have shown the same as having compartments $a$, $b$, and $c$ for provisions or other articles to be refrigerated, and with a chest, $d$, for the reception of ice, the lid of which is represented as open in the drawings.

The scale is made with a frame, $f$, with a cross-piece, 2, that is pivoted at $g$ to the refrigerator, so that it may be swung around upon said pivot to bring the platform $h$ of the scale outside the front of the refrigerator, or it may be swung around the other way to cause the frame to close into the refrigerator and be entirely out of the way, as illustrated by the dotted lines in Fig. 2.

The levers $l$, that intervene between the platform $h$ of the scale and the rod $n$ that leads to the scale-beam, are of any desired character, similar to those in platform-scales, and the rod $n$ is directly over the pivot $g$, on which the frame $f$ turns, so that the said rod will not be displaced when the frame $f$ is swung either one way or the other, and there is a swivel in this rod $n$ that allows of the said turning motion.

The scale-beam $r$ is of any usual character. It is suspended within a shallow chamber in the front of the refrigerator, and there is a door, $s$, by which the chamber can be closed so as to protect the scale.

There may be a provision-chamber in the refrigerator, behind the chamber containing the scale, and the same may have a lid or door at the top.

The space in which the frame $f$ is received is to be separated from the other portions of the refrigerator by suitable partitions $w$, so as to prevent injury to the scale, and there is a stop at $u$ that arrests the movement of the frame when turned in either one direction or the other.

By this improvement the scale is adapted to weighing ice or any other material, and it is not in the way of the other parts of the refrigerator, and the scale, when turned aside into the refrigerator, is protected from injury in transportation or otherwise.

I claim as my invention—

1. The combination, with the refrigerator, of the frame $f$, attaching-pivot $g$, scale-levers $l$, and platform $h$, capable of being swung into or out of the recess in the refrigerator, and the rod $n$ and scale-lever $r$ within a chamber of the refrigerator, substantially as set forth.

2. A scale-platform and levers and an attaching-pivot for the frame of said platform, in combination with the scale-beam and swiveled rod between the levers of the platform-scale and the scale-beam, said swiveled rod being in line with the pivot on which the platform can be turned, substantially as set forth.

Signed by me this 19th day of October, A. D. 1880.

GEO. F. GERRISH.

Witnesses:
GEO. T. PINCKNEY,
CHAS. H. SMITH.